United States Patent
Hannu et al.

(10) Patent No.: US 8,428,025 B2
(45) Date of Patent: Apr. 23, 2013

(54) APPARATUS AND METHOD FOR CONTROLLING USER EQUIPMENT STATE CHANGES

(75) Inventors: Hans Hannu, Luleå (SE); Jan Christoffersson, Luleå (SE); Mårten Ericson, Luleå (SE); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 105 days.

(21) Appl. No.: 13/117,423

(22) Filed: May 27, 2011

(65) Prior Publication Data

US 2011/0299485 A1    Dec. 8, 2011

Related U.S. Application Data

(60) Provisional application No. 61/350,592, filed on Jun. 2, 2010.

(30) Foreign Application Priority Data

May 17, 2011  (WO) ................ PCT/SE2011/050623

(51) Int. Cl.
*H04W 4/00* (2009.01)
(52) U.S. Cl.
USPC .......................................... 370/329
(58) Field of Classification Search .......... 370/328–350, 370/463
See application file for complete search history.

(56) References Cited

U.S. PATENT DOCUMENTS

| 6,347,091 | B1 | 2/2002 | Wallentin et al. |
| 7,099,346 | B1 * | 8/2006 | Kanterakis ................ 370/431 |
| 7,206,286 | B2 * | 4/2007 | Abraham et al. .......... 370/235 |
| 7,853,266 | B2 * | 12/2010 | Moinet et al. ............. 455/453 |

FOREIGN PATENT DOCUMENTS

| EP | 1798998 A1 | 6/2007 |
| GB | 2369003 A | 5/2002 |
| WO | 2006135200 A1 | 12/2006 |
| WO | 2009158163 A2 | 12/2009 |
| WO | 2010047630 A1 | 4/2010 |

OTHER PUBLICATIONS

TSGR2#6(99)807, RRC protocol States, TSG-RAN Working Group 2 (Radio layer 2 and Radio layer 3), 20 pages, Aug. 1999.*

* cited by examiner

*Primary Examiner* — Frank Duong
(74) *Attorney, Agent, or Firm* — Coats & Bennett, P.L.L.C.

(57) ABSTRACT

The present invention relates to an apparatus and method for triggering change of a Radio Resource Control (RRC) state for a user equipment operating in a cellular network. According to the method a Radio Link Control (RLC) buffer threshold associated with a Radio Link Control buffer is set to an initial value upon the user equipment entering a CELL_FACH RRC state. The RLC buffer threshold is decreased as a function of time. A RRC state change for the user equipment between the CELL_FACH RRC state and a CELL_DCH RRC state is triggered according to a predetermined rule based on a current size of the RLC buffer and the RLC buffer threshold. The method facilitates achieving a desired RRC state transition behavior for some types of users.

30 Claims, 6 Drawing Sheets

APPARATUS AND METHOD FOR CONTROLLING USER EQUIPMENT STATE CHANGES

RELATED APPLICATIONS

This application claims priority to U.S. Provisional Patent Appl. No. 61/350,592, filed Jun. 2, 2010, and to International Patent Appl. No. PCT/SE2011/050623, filed May 17, 2011, each of which is incorporated herein by reference in its entirety.

TECHNICAL FIELD

The embodiments described herein relate to controlling state changes for a user equipment operating in a cellular network and in particular to triggering a change of Radio Resource Control (RRC) state for the user equipment.

BACKGROUND

High-Speed Packet Access (HSPA) provides a major extension of the Wideband Code Division Multiple Access (WCDMA) radio interface. With HSPA it is now possible to provide mobile broadband since peak bit rates reach up to 42 Mbps in downlink using High-Speed Downlink Packet Access (HSDPA), and 11 Mbps in uplink using High-Speed Packet Uplink Access (HSUPA). The mentioned peak bit rates relate to standard specifications from $3^{rd}$ Generation Partnership Project (3GPP) release 8. For 3GPP release 9 the peak bit rates are doubled. Thus, HSPA can be seen as a complement and replacement to other types of broad band access such as Asymmetric Digital Subscriber Line (ADSL).

To keep user equipment (UE) power consumption down most cellular systems has several states. In WCDMA there are five Radio Resource Control (RRC) states. These RRC states are Idle, CELL_DCH, CELL_FACH, URA_PCH, and CELL_PCH. Data transfer between the user equipment (also referred to as terminal herein) and the network is only possible in the CELL_FACH and CELL_DCH states.

From a user performance perspective it is desirable to keep downlink and uplink transport channels configured to rapidly be able to transmit any user data. At the same time, maintaining a connection in uplink (UL) and downlink (DL) comes at a cost. From a network perspective interference caused by control signalling that takes place even in absence of data transmission is a cost. From a UE perspective power consumption is a main concern.

In the CELL_DCH state dedicated channels in both the uplink and the downlink are used. The UE location is known with an accuracy of the cell. In a Serving Gateway Support Node (SGSN) the UE's serving Radio Network Controller (RNC) is known. The CELL_DCH state corresponds to continuous transmission and reception and allows for rapid transmission of large amounts of user data, but has the highest battery power consumption in the UE of the different RRC states.

The CELL_FACH state does not use dedicated channels and thus allows reduced battery power consumption, at the expense of a lower uplink and downlink throughput. The UE location is known with an accuracy of cell (in the SGSN with the accuracy of the serving RNC). In the CELL_FACH state the UE can transmit data as part of a random access procedure.

URA_PCH and CELL_PCH are states in which the battery power consumption is very low but still allow for reasonable fast transitions to the states in which data transfer can occur. The UE location is known with the accuracy of UTRAN Registration Area or cell respectively, however paging is needed to reach the UE. In URA_PCH and CELL_PCH the UE sleeps and only occasionally wakes up to check for paging messages.

The Idle state is the state that has the lowest battery power consumption, but the transition from the Idle state to a state in which data transfer can occur takes the longest time. The UE is known in the SGSN with an accuracy of routing area.

3GPP release 7 provided enhancements of the CELL_FACH state. The enhanced CELL_FACH has the possibility to utilize a High Speed Downlink Shared Channel (HS-DSCH) for downlink transmission instead of a Forward Access channel (FACH) which has a rather limited maximum bit rate. With the use of the HS-DSCH, the bit rates can be improved to around 300-500 Kbps compared to 32 Kbps when using FACH. Note however, that the RRC state is still called CELL_FACH even through the HS-DSCH is used. Sometimes the term enhanced CELL_FACH is used to specify that the HS-DSCH channel is used for downlink transmissions. In 3GPP release 8 a similar enhancement was made to the uplink when Enhanced Dedicated Channel (E-DCH) transmission in CELL_FACH was made possible for data transmission, the access procedure is still similar to that specified according to 3GPP Release 99. The above mentioned improvement in bit rate is considerable. However, for some real time applications, such as Push-to-talk over Cellular (PoC), another even more important improvement is an almost continuous transmission during channel switching between CELL_FACH and CELL_DCH in 3GPP Release 7 and later releases, while a channel switch between CELL_FACH and CELL_DCH may cause a transmission gap of several 100 ms in 3GPP Release 99. Compared to being in the CELL_DCH state and using HS-DSCH there is no Hybrid automatic repeat request (HARQ) procedure in the CELL_FACH state, but an initial link adaptation may be done using RRC measurement reports.

Enabling use of HS-DSCH in CELL_FACH (enhanced downlink CELL_FACH) will increase the throughput compared to CELL_FACH according to 3GPP Release 99 which used the FACH. Correspondingly the throughput in the uplink will increase where the E-DCH is used to transmit the data which according to 3GPP release 99 would have been transmitted using a Random Access Channel (RACH) to transmit the data. There is a reduced need for processing and memory hardware in a radio base station (referred to as NodeB according to 3GPP terminology) when the UE is in CELL_FACH compared to when it is in the CELL_DCH state. The improved bitrates offered by HS-DSCH and/or E-DCH combined with the reduced need for processing and hardware and reduced channel switching signalling overhead means that it is highly beneficial to keep the UEs in the CELL_FACH state when transmitting intermittent bursts of data, instead of switching up to the CELL_DCH state.

However, there is only a limited link adaptation, based on RRC measurement reports, which can be used in enhanced DL CELL_FACH. This means that the transmission margins on power, supported transport format (bit rate) and number of fixed HARQ transmission need to be quite high. The larger margins are a waste of resources and lead to a lower performance and utilization of the enhanced DL CELL_FACH. So it is not efficient to transmit data continuously using enhanced DL CELL_FACH. In this case the user should be switched up to the CELL_DCH state.

There are current state of the art state switching mechanisms that use an algorithm that takes into account the amount of data a UE has to transmit along with a Radio Link Control (RLC) buffer threshold level. This will lead to up-switch of users who have a single large packet to transmit while at the same leaving users with continuous flow of small sized packets in CELL_FACH. This is generally not a preferred behaviour.

In typical implementations, the RLC buffer threshold is fixed to a given value that is the same for all users, or set differently per group or per UE, depending on user data characterization. However, selecting the RLC buffer threshold based on the user data characterization has the drawback that it requires deep packet inspection (DPI). DPI is done in the core network and not in the radio access network (RAN). Another drawback is that it requires keeping a lot of statistics per UE in the core network and ways to communicate to different nodes that take part in the state switching decisions. These drawbacks require heavy processing power, memory requirements, and standardized methods or protocols to communicate the information to the different nodes. Standardized methods or protocols are needed if the state switching algorithm is to work within nodes from different companies. Note also that DPI is problematic when the user runs a number of applications simultaneously, which is common on today's mobile broadband connections.

Hence, there is a need for a procedure that overcomes at least some of the drawbacks above.

SUMMARY

It is an object to provide a method and apparatus which obviate at least some of the above mentioned disadvantages. The above stated object is achieved by means of a method and apparatus according to the independent claims.

A first embodiment provides a method for triggering change of a Radio Resource Control (RRC) state for a user equipment operating in a cellular network. The method comprises a step of setting a Radio Link Control (RLC) buffer threshold associated with a Radio Link Control buffer to an initial value upon the user equipment entering a RRC state CELL_FACH. According to a further step of the method the RLC buffer threshold is decreased as a function of time. Furthermore the method comprises a step of triggering a RRC state change for the user equipment between the RRC state CELL_FACH and a RRC state CELL_DCH according to a predetermined rule based on a current size of the RLC buffer and the RLC buffer threshold.

A second embodiment provides an apparatus for triggering change of a RRC state for a user equipment operating in a cellular network. The apparatus comprises digital data processing circuitry. The digital data processing circuitry is configured to set a RLC buffer threshold associated with a RLC buffer to an initial value upon the user equipment entering a RRC state CELL_FACH. The digital data processing circuitry is further configured to decrease the RLC buffer threshold as a function of time. The digital data processing circuitry is further configured to trigger a RRC state change for the user equipment between the RRC state CELL_FACH and a RRC state CELL_DCH according to a predetermined rule based on a current size of the RLC buffer and the RLC buffer threshold.

An advantage of certain embodiments described herein is that they allow a RRC state switching procedure which is performed locally in the radio access network (RAN). The procedure could be handled by a RAN node handling the RRC protocol, which typically would be a radio network controller (RNC).

Another advantage is that some of the embodiments described herein facilitate achieving a RRC state transition behavior that avoids unnecessary signaling overhead and inefficient resource utilization. Some embodiments may e.g. be used to control the RRC state transition behavior such that the state CELL_FACH is used for intermittent traffic, which avoids unnecessary signaling overhead for the intermittent traffic, and such that CELL_DCH is used for more continuous traffic transactions, which avoids inefficient resource utilization for the continuous traffic transactions.

Further advantages and features of embodiments of the present invention will become apparent when reading the following detailed description in conjunction with the drawings.

DETAILED DESCRIPTION

The present invention will now be described more fully hereinafter with reference to the accompanying drawings, in which different exemplary embodiments are shown. These exemplary embodiments are provided so that this disclosure will be thorough and complete and not for purposes of limitation.

Figure 1:
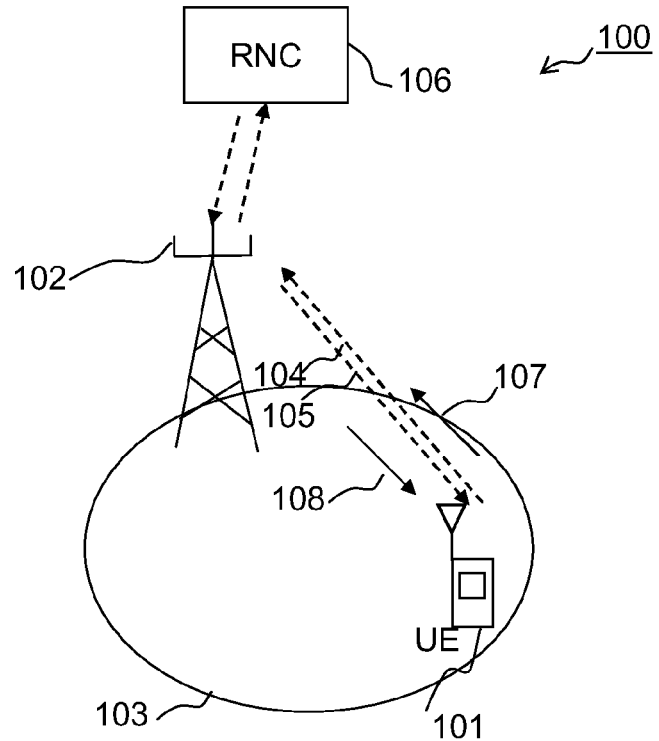
FIG. 1 is a schematic block diagram of a communication system in which embodiments of this disclosure may be implemented.

FIG. 1 illustrates an example of a communication system, in which embodiments of this disclosure may be implemented. The exemplary communication system is a High-Speed Packet Access (HSPA) system. For the sake of simplicity, only those parts of the communication system that are of particular relevance to the embodiments discussed herein are shown. The communication system comprises a cellular network 100, which includes a base station 102, serving a user equipment (UE) 101 in a serving cell 103. A base station is a common implementation of a NodeB in WCDMA/HSPA so the base station 102 will also be referred to as NodeB 102 herein. The UE 102 is able to communicate with the base station 102 via a number of uplink channels 104 and a number of downlink channels 105. A Radio Network Controller (RNC) 106 controls the base station 102, and is, among other things, in charge of management of radio resources in cells for which the RNC 106 is responsible.

Figure 2:
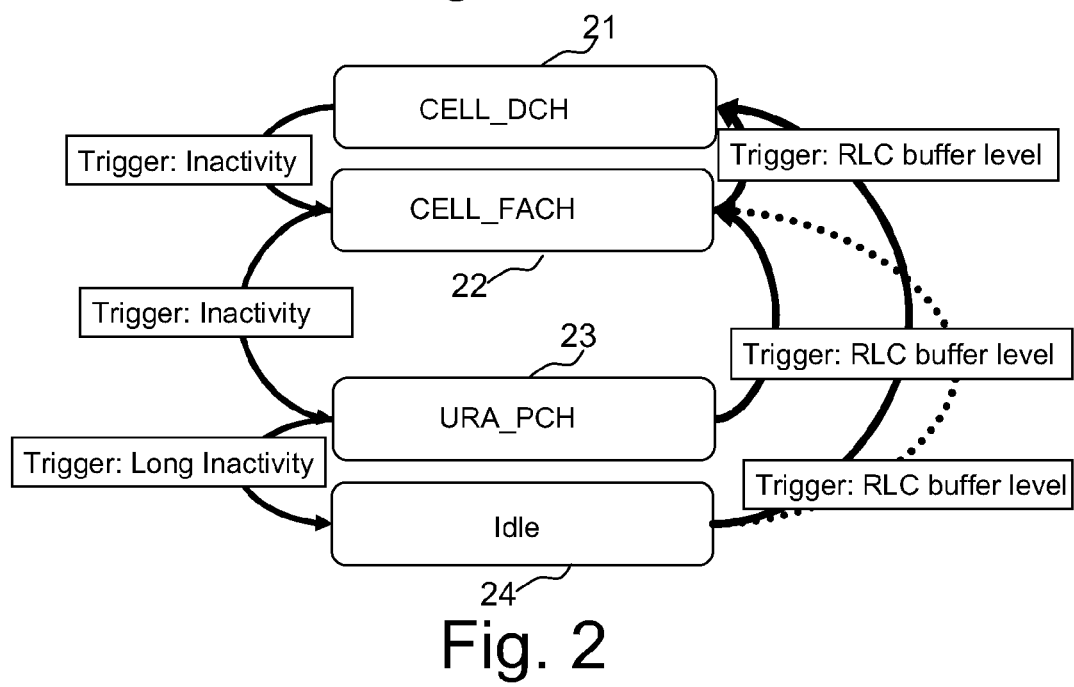
FIG. 2 is a state transition diagram illustrating different Radio Resource Control (RRC) states of a user equipment.

FIG. 2 illustrates one example of a possible state transition diagram that may be applied for the UE 101. State transitions are usually initiated due to amount of data in Radio Link Control (RLC) send buffers and due to the length of transmission inactivity. In FIG. 2 RRC states CELL_DCH 21, CELL_FACH 22, URA_PCH 23 and Idle 24 are illustrated. FIG. 2 illustrates the states in order with the state associated with the highest UE power consumption and shortest transmission delay at the top and the state associated with the lowest UE power consumption and the longest delay before transmission can occur at the bottom. FIG. 2 illustrates that a transition to a lower state is triggered by inactivity, i.e. transmission inactivity, while a transition to a higher state is triggered by RLC buffer level, i.e. if the RLC buffer level is above some specified threshold.

Figure 3:
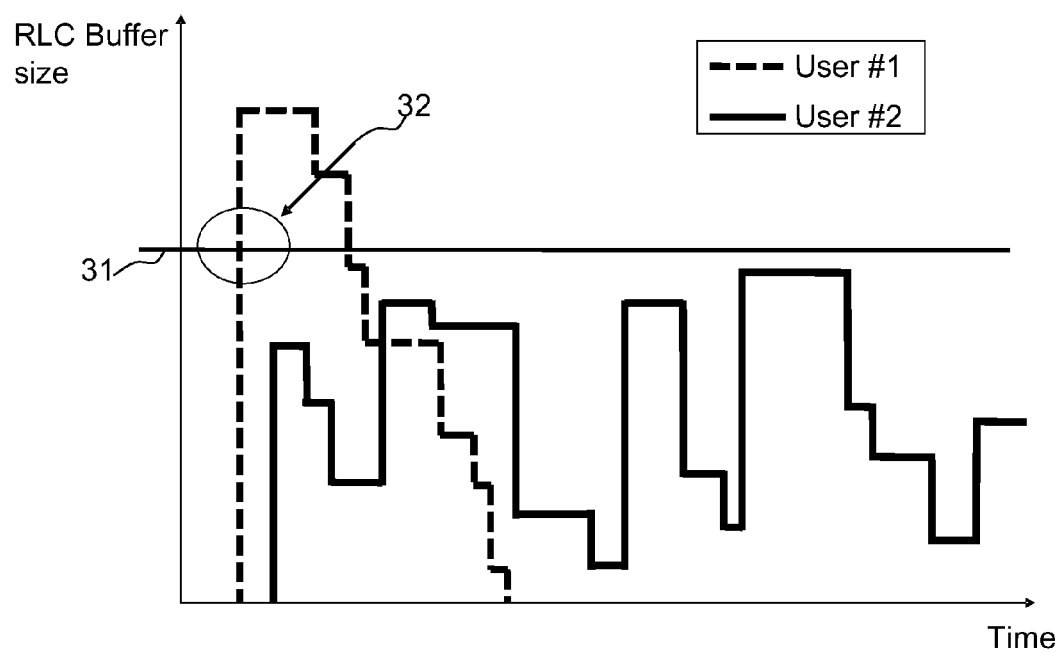
FIG. 3 is a diagram illustrating Radio Link Control (RLC) buffer size over time for two exemplary users.

FIG. 3 is a diagram illustrating Radio Link Control (RLC) buffer size over time for two exemplary users: user #1 and user #2. According to the prior art state switching mechanisms described above the RLC buffer threshold 31, which is used to trigger state switching, is fixed to a given value. This will lead to up-switch of users who have a single large packet (user #1 in FIG. 3) to transmit while at the same leaving users with continuous flow of small sized packets (user #2 in FIG. 3) in CELL_FACH. In FIG. 3, an arrow 32 indicates the point at which the user #1 is up-switched to CELL_DCH because the RLC buffer size reaches the RLC buffer threshold 31. This is generally not a preferred behaviour. It is generally preferred that user #1 should be left in CELL_FACH while user #2 should be switched up to CELL_DCH. Accordingly the consequences of the above mentioned state switching mechanism according to prior art is that the wrong user is up-switched.

Figure 4:
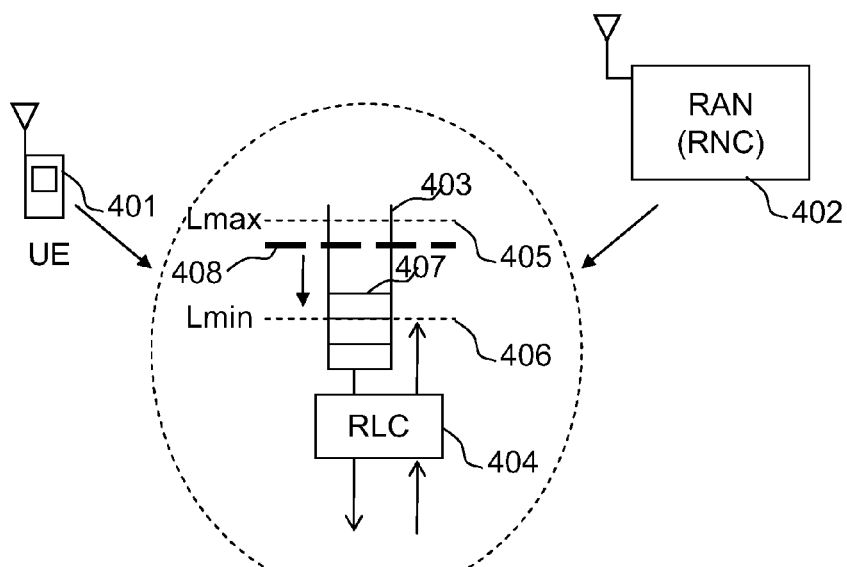
FIG. 4 is a schematic block diagram illustrating adjustment of a RLC buffer threshold according to embodiments of this disclosure.

The embodiments described below addresses the problem of when to switch a UE between the RRC states CELL_FACH and CELL_DCH based on the RLC buffer threshold. FIG. 4 is a schematic block diagram which will be used to illustrate some exemplary embodiments. The described embodiments may e.g. be used in connection with an RLC buffer for uplink communication located in a UE 401 or in connection with an RLC buffer for downlink communication located in a RNC 402. In FIG. 4 a RLC buffer 403 is schematically illustrated, which accordingly may be an RLC buffer for uplink or for downlink communication. The RLC layer 404, which, among other things, is responsible for segmentation of Internet Protocol (IP) packets into RLC Protocol Data Units (PDUs), is schematically illustrated in FIG. 4. Reference numeral 407 denotes a current size of the RLC buffer and a RLC buffer threshold is denoted by reference numeral 408.

An exemplary embodiment provides a method for triggering change of RRC state for the UE 401. According to the method the RLC buffer threshold 408 is set to an initial value Lmax 405 upon the UE 401 entering the RRC state CELL_FACH. The RLC buffer threshold 408 is then decreased as a function of time. A RRC state change is triggered for the UE 401 between the CELL_FACH state and the CELL_DCH state according to a predetermined rule based on the current size 407 of the RLC buffer 403 and the RLC buffer threshold 408.

Hence, there is provided a UE specific RLC buffer threshold 408 which varies with time. In the beginning of a UE transmission session when the first packet arrives to RLC buffer 403, the RLC buffer threshold 408 is set high. The RLC buffer threshold 408 thereafter decreases with time, i.e. as a function of time. In other words, according to this procedure users with more intermittent data transactions will be handled on CELL_FACH as the initial high RLC buffer threshold 408 would prevent these users to go up to CELL_DCH while users with more continuous data transactions will be switched to CELL_DCH as the transaction continues and the RLC buffer threshold 408 decreases.

Examples of intermittent traffic are users with chatty applications, for example users running applications with keep alive messages or user idle Internet web browsers that refresh the page from time to time. Examples of continuous traffic data transactions are user active Internet web browsing, file downloads and real time services such as Voice over IP (VoIP).

In different embodiments described herein the RLC buffer threshold value may be decreased from the initial value 405 according to different functions of time. In general, the RLC buffer threshold 408 for a connection may be written as $$\text{RLC buffer threshold} = f(L\max, L\min, t, t0) \quad (Eq.1),$$

where Lmax is the initial value 405 of the RLC buffer threshold 408, Lmin is a predefined minimum RLC buffer threshold 406, t is the current time, and t0 is the time at which the RLC buffer threshold 408 is set or reset to the initial value 405. Once the RLC buffer threshold 408 has been decreased to the predefined minimum RLC buffer threshold 406, the RLC buffer threshold is not decreased further. The RLC buffer threshold 408 may, according to certain embodiments, be reset to the initial value 405 if no new RLC data arrives at the RLC buffer 403 for a predetermined period of time.

An example function may e.g. be the following:

$$\text{RLC buffer threshold} = \max(L\max - K^*(t-t0), L\min) \quad (Eq. 2),$$

where Lmax is the initial value 405 of the RLC buffer threshold 408, Lmin is the predefined minimum RLC buffer threshold 406, t is the current time, t0 is the time at which the RLC buffer threshold 408 is set or reset to the initial value 405, and K is a constant. Thus according to Eq. 2 the RLC buffer threshold 408 is decreased linearly with time after arrival of a first packet of a new session/connection in the RLC buffer 403 triggering a state change to CELL_FACH for the UE 401 or after reset of the RLC buffer threshold 408.

Another example can be to decrease the RLC buffer threshold 408 non-linearly, i.e., $$\text{RLC buffer threshold} = \max(L\max - K1^*(t-t0) - K2^*(t-t0)^2, L\min) \quad (Eq. 3),$$

where Lmax is the initial value 405 of the RLC buffer threshold 408, Lmin is the predefined minimum RLC buffer threshold 406, t is the current time, t0 is the time at which the RLC buffer threshold 408 is set or reset to the initial value 405, and K1 and K2 are constants.

Parameters Lmax, Lmin, K, K1 and/or K2 can in some embodiments of the invention be adapted based on traffic characteristics for the UE, available system resources e.g. available radio base station/Node B processing capacity etc. If it for instance is known that a user is involved in VoIP session this knowledge may be used to set the above mentioned parameters appropriately for the associated UE. Available statistics may also be used to set the parameters per cell or per user. In other embodiments of the invention, these parameters may be fixed.

As mentioned above the embodiments presented herein are applicable both in downlink and uplink. Furthermore the embodiments are applicable for both 3GPP Release 99 RRC states as well as later 3GPP releases supporting either or both downlink HS-DSCH and uplink E-DCH transmissions in CELL_FACH.

In the uplink direction, the RLC buffer 403 is located in the UE 401 and the RLC buffer level is notified by signaling to the RNC 402. This signaling of the RLC buffer level from the UE to the RNC is illustrated as an arrow 107 in FIG. 1. The RNC 402, as with the case in the downlink direction, may then select to switch the UE 401 to CELL_DCH depending on the UE's RLC buffer level 407. So, in principle, the uplink and downlink directions work very similar when it comes to how to switch the RRC state from CELL_FACH to CELL_DCH. In the downlink direction, the RLC buffer 403 is located in the RNC 402, so there is no need for signaling of the UEs 401 buffer level 407. The RNC initiates a change of RRC state in the UE by means of signaling, which is illustrated with an arrow 108 in FIG. 1.

Figure 5:
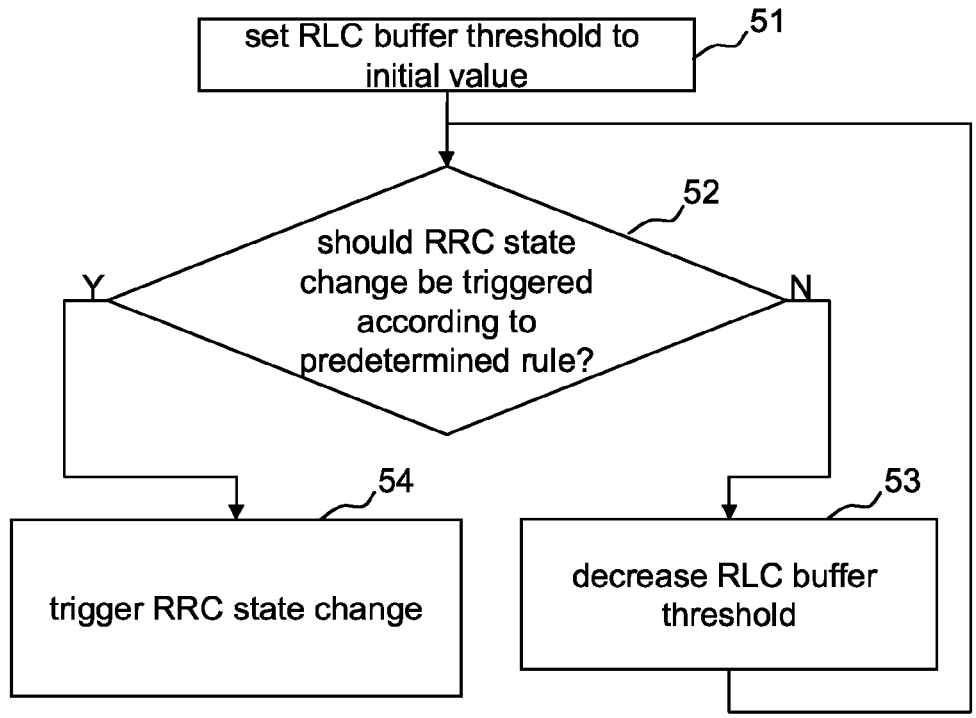
FIG. 5 is a flow diagram illustrating an embodiment of a method for triggering RRC state change for a user equipment.

FIG. 5 is a flow diagram illustrating an embodiment of a method for triggering RRC state change for the UE 401. In a step 51 the buffer threshold 408 is set to the initial value Lmax 405 upon the UE 401 entering the RRC state CELL_FACH. In a step 52 it is examined if a RRC state change is to be triggered according to a predetermined rule based the current size 407 of the RLC buffer 403 and the RLC buffer threshold 408. If it is determined in step 52 that a RRC state change is to be triggered to the RRC state CELL_DCH, this state change is triggered in a step 54. The RLC buffer threshold 408 is decreased in a step 53 if the UE is to remain in the CELL_FACH state. As indicated in FIG. 5 the step 52 is repeated after the step 53 and then the step 52 may be repeated again if no RRC state change is to be triggered. Accordingly the RLC buffer threshold 408 is decreased as a function of time while the UE is still in the CELL_FACH state.

Figure 6:
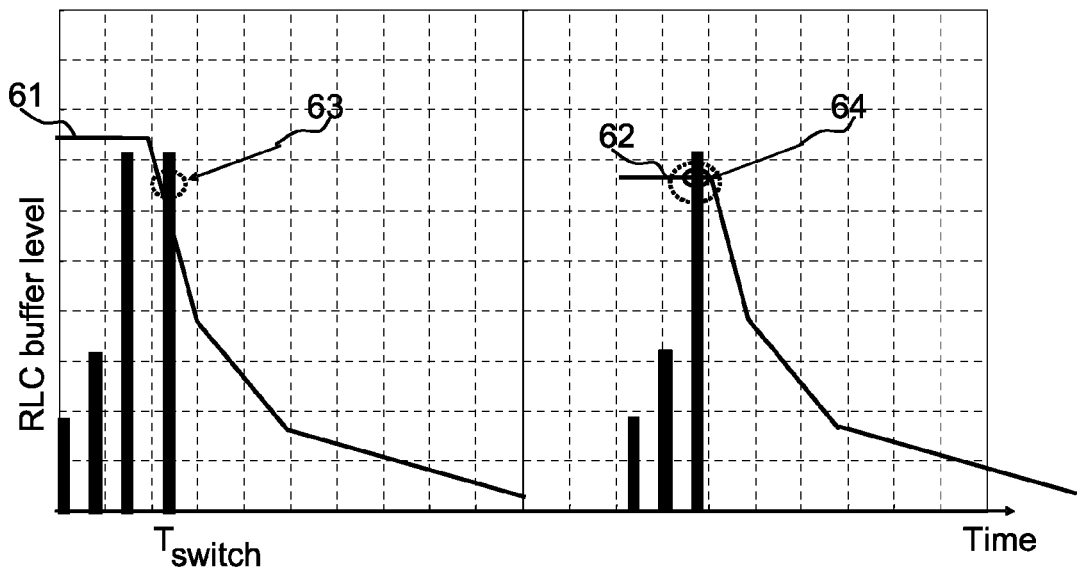
FIG. 6 is a diagram illustrating RLC buffer lever and a RLC buffer threshold over time for an exemplary user of an Internet web browser.
Figure 7:
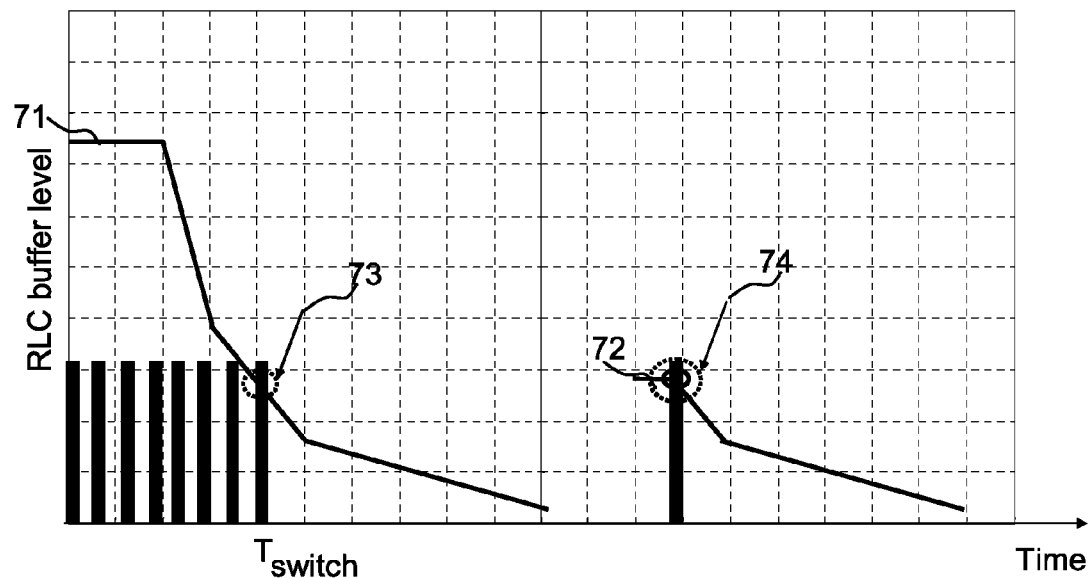
FIG. 7 is a diagram illustrating RLC buffer lever and a RLC buffer threshold over time for an exemplary real time streaming user.
Figure 8:
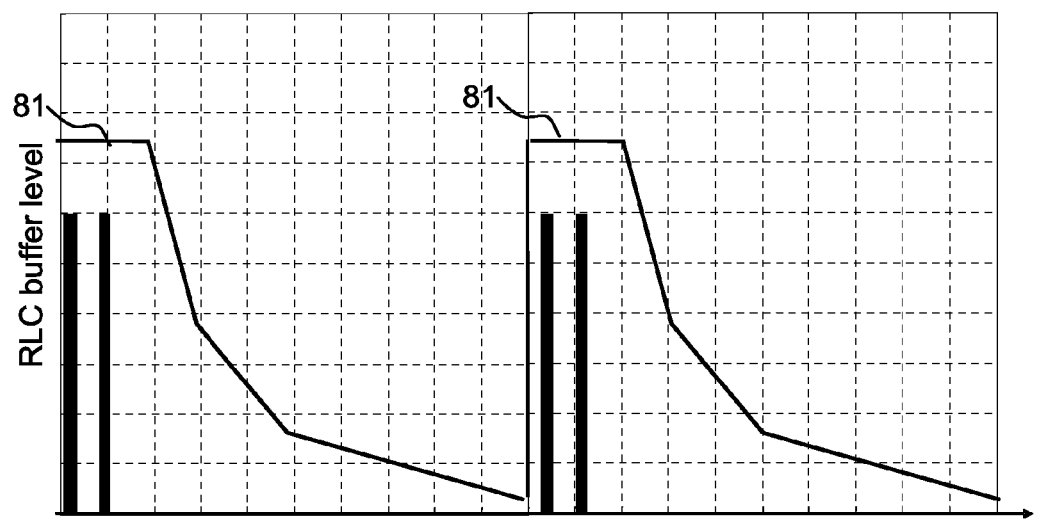
FIG. 8 is a diagram illustrating RLC buffer lever and a RLC buffer threshold over time for an exemplary user generating chatty traffic.

Some example scenarios illustrating use of some exemplary embodiments are shown in FIGS. 6-8. It is to be noted that in FIGS. 6-8 only peaks in the RLC buffer 403 are shown. After the peaks, the RLC buffer 403 is gradually emptied until either the buffer gets empty or new data is received in the buffer.

FIG. 6 is a diagram illustrating RLC buffer level for an Internet web browser user over time. A first data transaction is shown on the left hand side of the diagram and a later second data transaction is shown on the right hand side of the diagram. The curves indicate RLC buffer threshold for the first and second data transaction respectively. The RLC buffer threshold is set to an initial high value at the beginning of each transaction and then gradually decreased over time. The bars in the diagram indicate peaks in the RLC buffer level. It is assumed that the UE of the user is in the CELL_FACH state at the beginning of each data transaction. The initial value of the RLC buffer threshold for the first data transaction is indicated by reference numeral 61. During the first data transaction, the user data eventually triggers an up-switch to the CELL_DCH state at time Tswitch. The point at which the RLC buffer level exceeds the RLC buffer threshold and the switch from the CELL_FACH state to the CELL_DCH state is triggered is indicated by an arrow 63. Time passes and the user is eventually down-switched to the CELL_FACH state again. According to this illustrated embodiment, if the user then again has a data transaction within a given time period the system will remember the previous RLC buffer threshold and the user may be up-switched faster. This can be seen in FIG. 6 where an initial value 62 of the second transaction is lower than the initial value 61 of the first transaction due to the history of the first transaction and the previous state change from CELL_FACH to CELL_DCH. Accordingly the user is switched from CELL_FACH to CELL_DCH at a point indicated by reference numeral 64 during the second transaction. Thus according to this embodiment there is a memory function that retains previous buffer threshold values for a given time period. In other words there can be an idle timer, which upon expiration, after the given time period, restores the original initial value of the RLC buffer threshold. The given time period may in this scenario be e.g. 30 seconds-1 minute or some other time period that is considered appropriate to determine if the user seems to continue to browse the Internet. The memory function is specific for the user and may improve the user's experience by making it possible to switch the user to CELL_DCH faster. At the same time the fact that many users may need to be served with limited resources may have an effect in the opposite direction, i.e. to counterbalance so that the initial value of the RLC buffer is not set too low. The initial value of the buffer threshold may thus depend on not only history with respect to a previous state change but additionally or alternatively on load and/or available resources in the network. For example, if scheduling resources are scarce, a higher initial value of the RLC buffer threshold might be desired since a user in the CELL_DCH state requires more scheduling resources than a user in the CELL_FACH state. Another example is that if the UE is transmitting far from its power limit, it may be possible to raise the initial value of the RLC buffer threshold. The reason is that it can be expected that the UE generally is required to transmit at higher power in the CELL_FACH state than in the CELL_DCH state. In the embodiments where the system remembers the previous RLC buffer threshold, there can be a minimum RLC buffer threshold to ensure that the users are not too easily up-switched to CELL_DCH.

FIG. 7 is a diagram corresponding to that illustrated in FIG. 6 but for a real time streaming user. Just like in FIG. 6 a first data transaction and a second data transaction are illustrated in FIG. 7 for the real time streaming user. The initial value of the RLC buffer threshold for the first data transaction is indicated by reference numeral 71. During the first data transaction, the user data eventually triggers an up-switch to the CELL_DCH state at time Tswitch. The point at which the RLC buffer level exceeds the RLC buffer threshold and the switch from the CELL_FACH state to the CELL_DCH state is triggered is indicated by an arrow 73. Time passes and the user is eventually down-switched to the CELL_FACH state again. According to this illustrated embodiment, if the user then again has a data transaction within a given time period the system will remember the previous RLC buffer threshold and the user is up-switched faster. This can be seen in FIG. 7 where an initial value 72 of the second transaction is considerably lower than the initial value 71 of the first transaction due to the history of the first transaction and the previous state change from CELL_FACH to CELL_DCH. Accordingly the user is switched from CELL_FACH to CELL_DCH at a point indicated by reference numeral 74 during the second transaction. It can be noted that if the RLC buffer threshold had been fixed at the initial value 71, in accordance with the prior art state switching mechanisms discussed above, the real time streaming user would not be up-switched at all and system resources would be wasted.

FIG. 8 is a diagram corresponding to that of FIGS. 6 and 7 but for a chatty traffic user, i.e. a user that gives rise to short intermittent bursts of data. Just like in FIGS. 6 and 7, a first data transaction and a second data transaction are illustrated in FIG. 8 for the chatty traffic user. The initial value of the RLC buffer threshold for the first data transaction is indicated by reference numeral 81. It can be seen from the diagram that the RLC buffer level never exceeds the RLC buffer threshold during the first data transaction. Accordingly the user data does not trigger an up-switch to the CELL_DCH state. The same initial value 81 for the RLC buffer threshold is used for the second transaction as for the first transaction. No state change to the CELL_DCH state is triggered during the second transaction either so the chatty traffic user is kept in the CELL_FACH state, which is the desired behavior of the state switching mechanism in this case.

Figure 9:
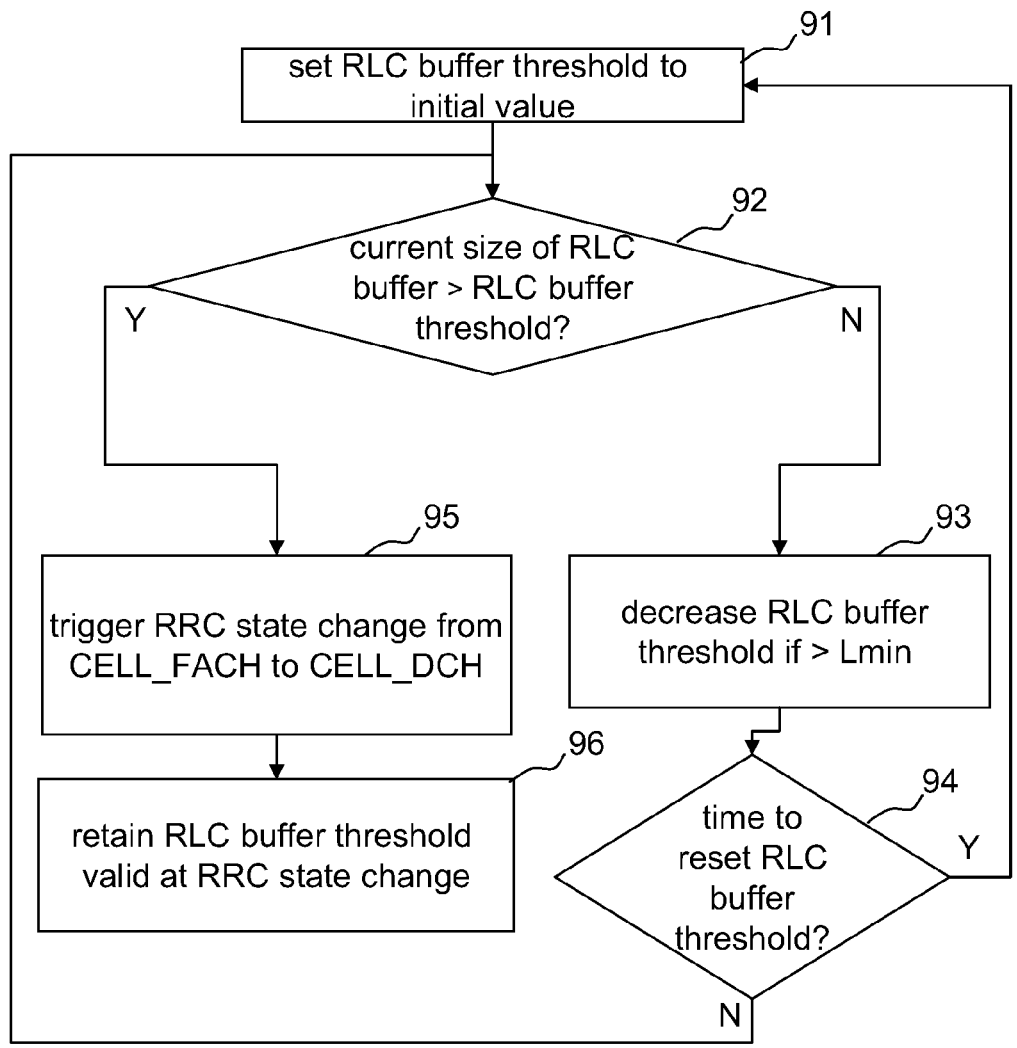
FIG. 9 is a flow diagram illustrating an alternative embodiment of a method for triggering RRC state change for a user equipment.

FIG. 9 is a flow diagram illustrating an exemplary embodiment of a method for triggering RRC state change for the UE 401. The method illustrated in FIG. 9 is an alternative embodiment to that illustrated in FIG. 5, which employs the memory function with respect to the initial value discussed above, as well as the above mentioned function to reset the RLC buffer threshold after a predetermined period of inactivity. In a step 91 the buffer threshold 408 is set to the initial value Lmax 405 upon the UE 401 entering the RRC state CELL_FACH. In a step 92 it is examined if the current size 407 of the RLC buffer 403 exceeds the RLC buffer threshold 408. If it is determined in step 92 that the current size 407 of the RLC buffer 403 exceeds the RLC buffer threshold 408, a RRC state change is triggered from the CELL_FACH state to the CELL_DCH state in a step 95. The RLC buffer threshold value that was valid at the time of the RRC state change from CELL_FACH to CELL_DCH is retained in a step 96. Retaining the RLC buffer threshold value means that the value is stored in a temporary memory for a given period of time, such that it can be used as the initial value if another data transaction with the same user in the CELL_FACH state occurs within the given time period as explained above. If it is determined in the step 92, that the current size 407 of the RLC buffer 403 does not exceed the RLC buffer threshold 408, the RLC buffer threshold is decreased in a step 93, unless the predefined minimum RLC buffer threshold Lmin 406 has been reached. In a step 94 it is checked if it is time to reset the RLC buffer threshold to the initial value, due to the fact that no new RLC data has arrived at the RLC buffer for a predetermined period of time, which might indicate end of the data transaction. If it is determined that it is time to reset the RLC buffer threshold to the initial value, the step 91 is repeated otherwise the step 92 is repeated. It can be noted, that in other exemplary embodiments, the order of certain steps illustrated in FIG. 9 may be changed. It is for instance possible that the step 96 is carried out before the step 95 or that the step 94 is carried out before the step 93, with the step 93 being performed after the step 94 if it is not time to reset the RLC buffer threshold.

The above description has mainly focused on RRC state changes from the CELL_FACH state to the CELL_DCH state. It is also possible to use a RLC buffer threshold to determine if a UE is to change from the CELL_DCH state to the CELL_FACH state. The RLC buffer threshold that is applied in the CELL_DCH state may be a different RLC buffer threshold than the one applied when the UE is in the CELL_FACH state or it may e.g. be the RLC buffer threshold that was valid at the time of the last transition from CELL_FACH to CELL_DCH which is retained in the CELL_DCH state. A change from the CELL_DCH state to the CELL_FACH state may e.g. be triggered if the UE is operating in CELL_DCH and the current size of the RLC buffer is below the RLC buffer threshold for a predetermined period of time.

The above described memory mechanism may be used in many different variations and may lead to that different initial values for the RLC buffer threshold is used depending on whether the CELL_FACH state is entered from the CELL_DCH state or from an RRC state associated with lower power consumption in the UE such as Idle, URA_PCH and CELL_PCH. The RLC buffer threshold may be set to a first initial value upon entering the RRC state CELL_FACH from the lower power consumption states. As mentioned above, upon entering RRC state CELL_FACH from CELL_DCH, the RLC buffer threshold may be set to a RLC buffer threshold value valid at the time the most recent change from CELL_FACH to CELL_DCH was triggered. Alternatively, the RLC buffer threshold is set to the first initial value also upon entering the CELL_FACH state from the CELL_DCH state, either because the above mentioned memory mechanism is not used at all or because the idle timer of the mechanism has expired.

A memory mechanism corresponding to the one described between CELL_FACH and CELL_DCH may also be used between CELL_FACH and URA_PCH or CELL_PCH. Thus the RLC buffer threshold value valid upon entering URA_PCH/CELL_PCH from CELL_FACH may be retained and if CELL_FACH is reentered from URA_PCH/CELL_PCH within a predefined period of time, the RLC buffer threshold is set to the retained value. A timer may be used such that the retained value is only applied if CELL_FACH is reentered within a predefined time period from the entry into the URA_PCH/CELL_PCH state.

Figure 10:
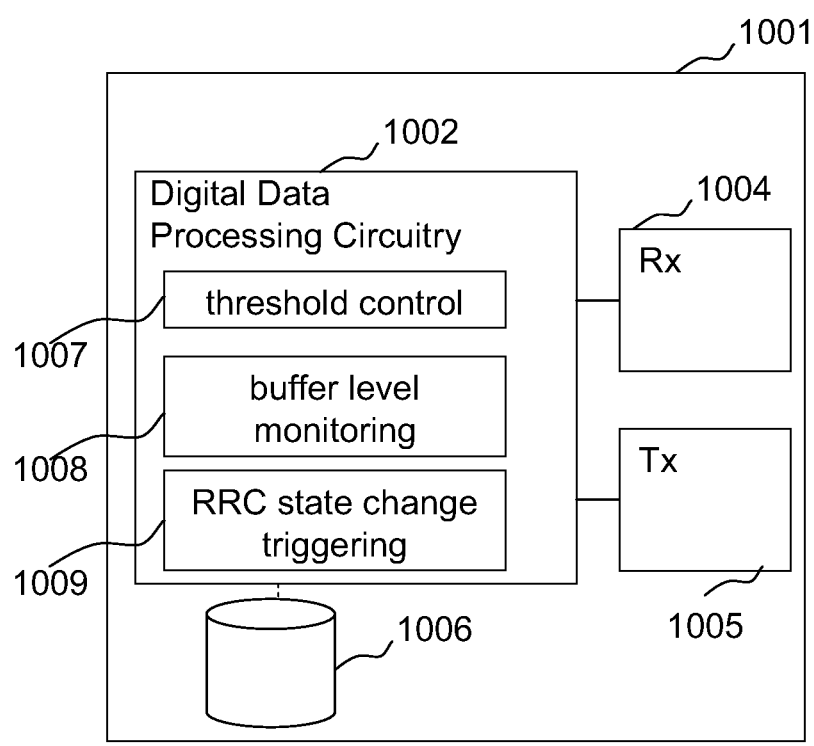
FIG. 10 is a schematic block diagram of an apparatus according to an embodiment of this disclosure.

FIG. 10 is a schematic block diagram of an exemplary embodiment of an apparatus 1001 for triggering change of RRC state for a user equipment. The apparatus 1001 may e.g. be comprised in an RNC, the components of the apparatus may thus be integrated with other components of the RNC. The apparatus 1001 is adapted to perform the method according to FIG. 5 or FIG. 9. As illustrated in FIG. 10, the apparatus 1001 comprises digital data processing circuitry 1002, receiver circuitry 1004 for wireless or wireline reception of data messages, transmitter circuitry 1005 for wireless or wireline transmission of data messages. The receiver circuitry 1004 and transmitter circuitry 1005 may alternatively be integrated in a transceiver unit. The receiver circuitry 1004 is particularly adapted to receive signalling messages indicating a current size of an RLC buffer for uplink communication located in a UE. The transmitter circuitry is particularly adapted to transmit signalling messages to a UE to trigger RRC state changes for the UE. The digital data processing circuitry is particularly configured to perform or control the method steps illustrated in FIGS. 5 and 9. For this purpose the digital data processing circuitry may be configured to execute different program modules. In FIG. 10, three exemplary program modules 1007, 1008 and 1009 are illustrated. The program module 1007 is a threshold control module for controlling the RLC buffer threshold that is to be applied for different users at different times. The program module 1008 is a buffer level monitoring module for controlling current sizes of different RLC buffers. The program module 1009 is RRC state change triggering module for triggering RRC state changes of UEs based on predetermined rules. The program modules are merely some examples and other program modules may be used in alternative embodiments. The apparatus 1001 in FIG. 10 also includes a memory 1006. The memory may store the program modules 1007, 1008 and 1009 and/or RLC buffer threshold values that are to be retained if the above mentioned memory mechanism is used. The digital data processing circuitry 1002 may be embodied in the form of one or more programmable processors programmed to perform the steps according to FIG. 5 and/or FIG. 9. However, any data processing circuitry or combination of different types of processing circuits that is capable of performing the mentioned steps could be used. The program modules 1007, 1008 and 1009, may be comprised in one or several computer program products embodied in the form of a volatile or non-volatile memory, e.g. a RAM, an EEPROM, a flash memory or a disc drive. The program modules 1007, 1008 and 1009 would generally be implemented in software, although implementations completely or partly in firmware, hardware or combinations thereof are also feasible.

From the description above it is apparent that an advantage of some embodiments described above is that improved efficiency in usage of the CELL_FACH and CELL_DCH states may be achieved. The reason is that the embodiments may be used to ensure that the CELL_FACH state is used for traffic transmitted in short intermittent bursts, which avoids unnecessary signaling overhead for this traffic, and that CELL_DCH is used for continuous traffic transactions, which avoids inefficient resource utilization. As mentioned above transmission margins on power, supported bit rate and number of fixed HARQ transmission need to be quite high in the CELL_FACH state. Therefore the CELL_DCH state is generally preferred for continuous traffic transactions in order to avoid inefficient resource utilization.

Another advantage of some of the embodiments presented herein is that they are simple to implement. According to some embodiments, a simple software update of an existing RNC is required to implement the embodiments. Accordingly the embodiments may not require any new hardware. In addition, no new measurements are needed, which also facilitates implementation.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method for triggering a change of a Radio Resource Control (RRC) state for a user equipment operating in a cellular network, the method comprising:
    setting a Radio Link Control (RLC) buffer threshold associated with an RLC buffer to an initial value upon the user equipment entering a CELL_FACH RRC state;
    decreasing the RLC buffer threshold as a function of time; and
    triggering an RRC state change for the user equipment between the CELL_FACH RRC state and a CELL_DCH RRC state according to a predetermined rule based on a current size of the RLC buffer and the RLC buffer threshold.

2. The method according to claim 1, wherein the RRC state change is triggered from the CELL_FACH RRC state to the CELL_DCH RRC state if the user equipment is operating in the CELL_FACH RRC state and the current size of the RLC buffer exceeds the RLC buffer threshold.

3. The method according to claim 1, wherein the RRC state change is triggered from the CELL_DCH RRC state to the CELL_FACH RRC state if the user equipment is operating in the CELL_DCH RRC state and the current size of the RLC buffer is below the RLC buffer threshold for a predetermined period of time.

4. The method according to claim 1, further comprising resetting the RLC buffer threshold to the initial value if no new RLC data arrives at the RLC buffer for a predetermined period of time.

5. The method according to claim 1, wherein once the RLC buffer threshold has been decreased to a predefined minimum RLC buffer threshold, the RLC buffer threshold is not decreased further.

6. The method according to claim 1, wherein the RLC buffer threshold is defined as $$\max(L\max-K*(t-t0), L\min),$$

wherein
    Lmax is the initial value of the RLC buffer threshold,
    Lmin is a predefined minimum RLC buffer threshold,
    t is the current time,
    t0 is the time at which the RLC buffer threshold is set or reset to the initial value, and
    K is a constant.

7. The method according to claim 1, wherein the initial value depends on the load of the cellular network.

8. The method according to claim 1, wherein the initial value depends on stored information about a previously triggered RRC state change for the user equipment.

9. The method according to claim 1, wherein upon entering the CELL_FACH RRC state from the CELL_DCH RRC state, the RLC buffer threshold is set to a RLC buffer threshold value valid at the time the most recent change from the CELL_FACH RRC state to the CELL_DCH RRC state was triggered for the user equipment.

10. The method according to claim 1, wherein setting the RLC buffer threshold comprises retaining the RLC buffer threshold value valid upon entering a lower power consumption RRC state from the CELL_FACH RRC state and setting the RLC buffer threshold to the retained value if the CELL_FACH RRC state is reentered from the lower power consumption RRC state within a predefined period of time.

11. The method according to claim 10, wherein the lower power consumption RRC state is one of Idle, URA_PCH and CELL_PCH.

12. The method according to claim 1, wherein setting the RLC buffer threshold comprises retaining the RLC buffer threshold value valid upon entering the CELL_DCH RRC state from the CELL_FACH RRC state.

13. The method according to claim 1, wherein the RLC buffer is a RLC buffer for uplink communication and is located in the user equipment.

14. The method according to claim 1, wherein the RLC buffer is a RLC buffer for downlink communication and is located in a Radio Network Controller of the cellular network.

15. The method according to claim 1, wherein the method is performed in a Radio Network Controller of the cellular network.

16. An apparatus for triggering a change of a Radio Resource Control (RRC) state for a user equipment operating in a cellular network, the apparatus comprising digital data processing circuitry configured to:
    set a Radio Link Control (RLC) buffer threshold associated with an RLC buffer to an initial value upon the user equipment entering a CELL_FACH RRC state;
    decrease the RLC buffer threshold as a function of time; and
    trigger a RRC state change for the user equipment between the CELL_FACH RRC state and a CELL_DCH RRC state according to a predetermined rule based on a current size of the RLC buffer and the RLC buffer threshold.

17. The apparatus according to claim 16, wherein the digital data processing circuitry is configured to trigger the RRC state change from the CELL_FACH RRC state to the CELL_DCH RRC state if the user equipment is operating in the CELL_FACH RRC state and the current size of the RLC buffer exceeds the RLC buffer threshold.

18. The apparatus according to claim 16, wherein the digital data processing circuitry is configured to trigger the RRC state change from the CELL_DCH RRC state to the CELL_FACH RRC state if the user equipment is operating in the CELL_DCH RRC state and the current size of the RLC buffer is below the RLC buffer threshold for a predetermined period of time.

19. The apparatus according to claim 16, wherein the digital data processing circuitry is configured to reset the RLC buffer threshold to the initial value if no new RLC data arrives at the RLC buffer for a predetermined period of time.

20. The apparatus according to claim 16, wherein the digital data processing circuitry is configured to not decrease the RLC buffer threshold further once the RLC buffer threshold has been decreased to a predefined minimum RLC buffer threshold.

21. The apparatus according to claim 16, wherein the digital data processing circuitry is configured to define the RLC buffer threshold as $$\max(Lmax-K*(t-t0), Lmin),$$

wherein
Lmax is the initial value of the RLC buffer threshold,
Lmin is a predefined minimum RLC buffer threshold,
t is the current time,
t0 is the time at which the RLC buffer threshold is set or reset to the initial value, and
K is a constant.

22. The apparatus according to claim 16, wherein the digital data processing circuitry is configured to determine the initial value based on the load of the cellular network.

23. The apparatus according to claim 16, wherein the digital data processing circuitry is configured to determine the initial value based on stored information about a previously triggered RRC state change for the user equipment.

24. The apparatus according to claim 16, wherein the digital data processing circuitry is configured to set the RLC buffer threshold to a RLC buffer threshold value valid at the time the most recent change from the CELL_FACH RRC state to the CELL_DCH RRC state was triggered for the user equipment upon entering the CELL_FACH RRC state from the CELL_DCH RRC state.

25. The apparatus according to claim 16, wherein the digital data processing circuitry is configured to retain the RLC buffer threshold value valid upon entering a lower power consumption RRC state from the CELL_FACH RRC state and to set the RLC buffer threshold to the retained value if the CELL_FACH RRC state is reentered from the lower power consumption RRC state within a predefined period of time.

26. The apparatus according to claim 25, wherein the lower power consumption RRC state is one of Idle, URA_PCH and CELL_PCH.

27. The apparatus according to claim 16, wherein the digital data processing circuitry is configured to retain the RLC buffer threshold value valid upon entering the CELL_DCH RRC state from the CELL_FACH RRC state.

28. The apparatus according to claim 16, wherein the RLC buffer is a RLC buffer for uplink communication and is located in the user equipment.

29. The apparatus according to claim 16, wherein the RLC buffer is a RLC buffer for downlink communication and is located in a Radio Network Controller, RNC, of the cellular network.

30. The apparatus according to claim 16, wherein the apparatus is comprised in a Radio Network Controller of the cellular network.

* * * * *